(12) United States Patent
Shin et al.

(10) Patent No.: US 7,871,722 B2
(45) Date of Patent: Jan. 18, 2011

(54) ELECTRODE ASSEMBLY PREPARED IN LONGITUDINAL FOLDING MANNER AND ELECTROCHEMICAL CELL EMPLOYING THE SAME

(75) Inventors: Youngjoon Shin, Daejeon (KR); Min Su Kim, Daejeon (KR); Ji Heon Ryu, Seoul (KR); Jeong Hee Choi, Busan (KR); Seung-Jin Yang, Yongin-si (KR)

(73) Assignee: LG Chem, Ltd. (KR)

( * ) Notice: Subject to any disclaimer, the term of this patent is extended or adjusted under 35 U.S.C. 154(b) by 1135 days.

(21) Appl. No.: 11/548,084

(22) Filed: Oct. 10, 2006

(65) Prior Publication Data
US 2007/0105014 A1    May 10, 2007

(30) Foreign Application Priority Data
Nov. 8, 2005    (KR)    ............ 10-2005-0106219

(51) Int. Cl.
*H01M 6/46* (2006.01)
*H01M 6/26* (2006.01)

(52) U.S. Cl. .............. 429/152; 429/150; 429/160; 429/161; 429/162

(58) Field of Classification Search ........... 429/152, 429/160, 161, 162, 211
See application file for complete search history.

(56) References Cited
U.S. PATENT DOCUMENTS
2005/0042516 A1* 2/2005 Oh et al. ........... 429/246

2006/0051668 A1* 3/2006 Chung et al. ........... 429/185

FOREIGN PATENT DOCUMENTS
| KR | 1020010082058 | 8/2001 |
|---|---|---|
| KR | 1020010082059 | 8/2001 |
| KR | 1020010082060 | 8/2001 |

* cited by examiner

*Primary Examiner*—Patrick Ryan
*Assistant Examiner*—Muhammad Siddiquee
(74) *Attorney, Agent, or Firm*—Cantor Colburn LLP

(57) ABSTRACT

Disclosed herein are an electrode assembly including a plurality of unit cells folded by a continuous separation film wherein the unit cells are arranged on the separation film such that electrode taps of the unit cells face each other, the separation film has openings corresponding to the electrode taps of the unit cells, and the electrode assembly is manufactured by folding the unit cells in the longitudinal (lengthwise) direction of the separation film while the unit cells are disposed such that the electrode taps of the unit cells are inserted into the corresponding openings, and an electrochemical cell, such as a secondary battery, including the same. The electrode assembly according to the present invention is a hybrid type electrode assembly solving the problems of the jelly-roll type electrode assembly and the stacking type electrode assembly. Consequently, when external impacts are applied to the electrode assembly, for example, the electrode assembly falls, it is possible to minimize the occurrence of internal short circuits and thus to improve the safety of the electrode assembly. Furthermore, it is possible to perform the process for impregnating (wetting) the electrolyte into the electrodes in a short time during the assembly of the electrochemical cell.

8 Claims, 6 Drawing Sheets

(C type bicell)

(A type bicell)

ELECTRODE ASSEMBLY PREPARED IN LONGITUDINAL FOLDING MANNER AND ELECTROCHEMICAL CELL EMPLOYING THE SAME

FIELD OF THE INVENTION

The present invention relates to a longitudinally folding-type electrode assembly and an electrochemical cell including the same, and, more particularly, to an electrode assembly including a plurality of unit cells folded by a continuous separation film wherein the unit cells are arranged on the separation film such that electrode taps of the unit cells face each other, the separation film has openings corresponding to the electrode taps of the unit cells, and the electrode assembly is manufactured by folding the unit cells in the longitudinal (lengthwise) direction of the separation film while the unit cells are disposed such that the electrode taps of the unit cells are inserted into the corresponding openings, and an electrochemical cell, such as a secondary battery, including the same.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high voltage, extended service-life, and low self discharge rate, which has been commercialized and widely used.

Based on the construction of electrodes and an electrolyte, the lithium secondary battery may be classified as a lithium-ion battery, a lithium-ion polymer battery, or a lithium polymer battery. Among them, the lithium-ion polymer battery has been increasingly used because the lithium-ion polymer battery has a low possibility of electrolyte leakage and can be easily manufactured.

An electrode assembly having a cathode/a separator/an anode structure, which constitutes the secondary battery, may be generally classified as a jelly-roll (winding) type electrode assembly or a stacking type electrode assembly based on the structure of the electrode assembly. The jelly-roll type electrode assembly is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and winding the anode/separator/cathode structure. The jelly-roll type electrode assembly is suitable for cylindrical cells; however, the jelly-roll type electrode assembly is not suitable for prismatic cells or pouch-shaped cells because the electrode active material may be detached, and the spatial utilizability is low. On the other hand, the stacking type electrode assembly is an electrode assembly constructed in a structure in which a plurality of cathode and anode units are sequentially stacked one on another. The stacking type electrode assembly has an advantage in that the stacking type electrode assembly can be constructed in a prismatic structure; however, the stacking type electrode assembly has disadvantages in that a process for manufacturing the stacking type electrode assembly is complicated and troublesome, and, when external impacts are applied to the stacking type electrode assembly, electrodes of the stacking type electrode assembly are pushed with the result that short circuits occur in the stacking type electrode assembly.

In order to solve the above-described problems, there has been developed an electrode assembly having a novel structure, which is a combination of the jelly-roll type electrode assembly and the stacking type electrode assembly, i.e., an electrode assembly constructed in a structure in which full cells having a cathode/separator/anode structure of a predetermined unit size or bicells having a cathode (anode)/separator/anode (cathode)/separator/cathode (anode) structure are folded using a long continuous separation film. Examples of such an electrode assembly are disclosed in Korean Unexamined Patent Publication No. 2001-82058, No. 2001-82059, and No. 2001-82060, which have been filed in the name of the applicant of the present patent application. Hereinafter, the electrode assembly having the above-described structure will be referred to as a hybrid type electrode assembly.

A secondary battery having the above-described stacking type or hybrid type electrode assembly mounted in a battery case may constructed in various shapes. A representative example of the secondary battery may be a lithium-ion polymer battery (LiPB) having a pouch-shaped case made of an aluminum laminate sheet.

The lithium-ion polymer battery is constructed in a structure in which an electrode assembly manufactured by thermally welding electrodes (cathodes and anodes) and separators is impregnated with an electrolyte. Mostly, the lithium-ion polymer battery is constructed in a structure in which the stacking type or the hybrid type electrode assembly is mounted in the pouch-shaped case made of the aluminum laminate sheet in a sealed state. For this reason, the lithium-ion polymer battery is often referred to as a pouch-shaped battery.

FIGS. 1 and 2 typically illustrate a general structure of a representative lithium-ion polymer battery including a stacking type electrode assembly.

Referring to these drawings, a lithium-ion polymer battery 100 is constructed in a structure in which an electrode assembly 300 including cathodes, anodes, and separators disposed between the cathodes and the anodes is mounted in a pouch-shaped battery case 200, cathode and anode taps 310 and 320 of the electrode assembly 300 are welded to two electrode leads 400 and 410, respectively, and the electrode assembly 300 is sealed in the battery case 200 while electrode leads 400 and 410 are exposed to the outside of the battery case 200.

The battery case 200 is made of a soft wrapping material, such as an aluminum laminate sheet. The battery case 200 includes a case body 210 having a hollow receiving part 230 for receiving the electrode assembly 300 and a cover 220 connected to the case body 210 at one side thereof.

The electrode assembly 300 of the lithium-ion polymer battery 100 may be constructed in the previously-described jelly-roll type structure in addition to the stacking type structure shown in FIG. 1. The stacking type electrode assembly 300 is constructed in a structure in which the cathode taps 310 and the anode taps 320 are welded to the electrode leads 400 and 410, respectively, and insulative films 500 are attached to the upper and lower surfaces of the electrode leads 400 and 410 for securing electrical insulation and sealing between the electrode leads 400 and 410 and the battery case 200.

When a lithium secondary battery, such as the lithium-ion polymer battery, is exposed to high temperature, or when a large amount of current flows in a short time due to overdischarge, an external short circuit, a nail penetration, a local crush, or a drop-induced short circuit, the battery is heated due to IR heat generation with the result that the battery may catch fire or explode. As the temperature of the battery is increased, the reaction between the electrolyte and the electrodes is accelerated. As a result, heat of reaction is generated, and therefore, the temperature of the battery is further increased, which accelerates the reaction between the electrolyte and the electrodes. As a result, the temperature of the battery is sharply increased, and therefore, the reaction between the electrolyte and the electrodes is accelerated. This vicious cycle causes a thermal runaway phenomenon in which the temperature of the battery is sharply increased. When the temperature of the battery is increased to a predetermined temperature level, the battery may catch fire. Also, as a result of the reaction between the electrolyte and the electrodes, gas is generated, and therefore, the internal pressure of the battery is increased. When the internal pressure of the battery is increased to a predetermined pressure level, the lithium secondary battery may explode. This possibility that the lithium secondary battery catches fire and explodes is the most fatal disadvantage of the lithium secondary battery.

Especially, the battery case of the lithium-ion polymer battery is made of a soft wrapping material having low strength. As a result, the battery case of the lithium-ion polymer battery is easily deformed when the battery case falls or external impacts are applied to the battery case. As shown in FIG. 2, a space 230a is provided at the upper end of the electrode assembly 300 in the battery case 200 such that the electrode taps of the electrode assembly are connected to the electrode leads 400 and 410 by welding in the space 230a. Consequently, when external impacts are applied to the battery at the upper end of the battery due to the falling of the battery, the electrode assembly 300 is moved toward the upper end space 230a, and, therefore, the electrode leads 400 and 410 are brought into contact with the upper end or the outermost electrodes of the electrode assembly 300 with the result that an internal short circuit may occur. The falling of the battery frequently occurs during the use of the battery. Consequently, the demand of a technology for more efficiently securing the safety of the battery is very high.

Some of conventional arts propose a method of attaching adhesive tape to predetermined positions of the electrode assembly and a method of filling the upper space of the electrode assembly with a foreign material, in order to prevent the internal short circuit due to the movement of the electrode assembly. However, these methods have a problem in that the adhesive tape and the foreign material chemically react with the electrolyte, and therefore, the performance of the battery is reduced.

In addition to the above safety-related problem, one of the problems caused during the manufacture of the battery is the impregnation of the electrodes with the electrolyte, i.e., the wetting characteristic.

For example, the lithium secondary battery uses metal oxide, such as $LiCoO_2$, as a cathode active material, and carbon as an anode active material. Polyolefin-based porous separators are disposed between the anodes and the cathodes, and a non-aqueous electrolyte including lithium salt, such as $LiPF_6$, is injected into the lithium secondary battery. In this way, the lithium secondary battery is manufactured. During the charge of the lithium secondary battery, lithium ions are discharged from the cathode active material and inserted into a carbon layer of the anode. During the discharge of the lithium secondary battery, on the other hand, lithium ions are discharged from the carbon layer of the anode and inserted into the cathode active material. At this time, the non-aqueous electrolyte serves as a medium to move the lithium ions between the anode and the cathode. It is necessary for the lithium secondary battery to be basically stable within the operating voltage range of the battery and have a performance to transfer ions at sufficiently high speed.

The non-aqueous electrolyte is injected into the battery at the final stage of manufacturing the lithium secondary battery. At this time, the electrodes must be rapidly and completely wetted by the electrolyte so as to reduce the time necessary for manufacturing the battery and optimize the performance of the battery.

A non-protic organic solvent, such as ethylene carbonate, diethyl carbonate, or 2-methyl tetrahydrofuran, is mainly used as the non-aqueous electrolyte of the lithium secondary battery. Such an electrolyte is a polar solvent having polarity enough to effectively dissolve and dissociate the electrolyte salt, and, at the same time, a non-protic solvent having no active hydrogen. This electrolyte has high viscosity and surface tension due to wide interaction in the electrolyte. Consequently, the non-aqueous electrolyte of the lithium secondary battery has a low affinity for an electrode material including a polytetrafluoroethylene and polyvinylidene fluoride bonding agent, and, as a result, the electrode material is not easily wetted by the non-aqueous electrolyte. This is one of principal factors to ineffectively increase the time necessary for manufacturing the battery.

When the activating operation of the battery is carried out while the electrodes are not efficiently wetted by the electrolyte, a solid electrolyte interface (SEI) film is not properly formed at the anode, and therefore, the service life of the battery is reduced.

For this reason, an additional process, such as aging, for maintaining the wet state of the anode, such that the anode can be sufficiently wetted by the electrolyte, after the injecting the electrolyte, or a special process for applying vacuum or pressure to the electrodes has been performed in order to accelerate the wetting of the electrolyte to the electrodes.

The hybrid type electrode assembly constructed as described above has many advantages; however, the hybrid type electrode assembly also has a disadvantage in that the separation film covers the sides of the electrodes, and therefore, the electrolyte can access only to the upper and lower ends of the electrodes. Generally, the sides of the electrodes are longer than the upper and lower ends of the electrodes. In the hybrid type electrode assembly, therefore, the area of the electrode contacting the electrolyte is reduced with the result that the wetting operation of the electrolyte is inevitably lengthened.

SUMMARY OF THE INVENTION

Therefore, the present invention has been made to solve the above-mentioned problems, and other technical problems that have yet to be resolved.

Specifically, it is a first object of the present invention to provide an electrode assembly having a structure in which an internal short circuit is minimized, even when external impacts are applied to the electrode assembly, for example, the electrode assembly falls, and therefore, the safety of the electrode assembly is improved.

It is a second object of the present invention to provide an electrode assembly having a structure in which an impregnating (wetting) operation of an electrolyte into electrodes is performed in a short time during the assembly of an electrochemical cell.

It is a third object of the present invention to provide an electrochemical cell including the above-described electrode assembly.

In accordance with the present invention, the above and other objects can be accomplished by the provision of an electrode assembly including a plurality of unit cells folded by a continuous separation film wherein the unit cells are arranged on the separation film such that electrode taps of the unit cells face each other, the separation film has openings corresponding to the electrode taps of the unit cells, and the electrode assembly is manufactured by folding the unit cells in the longitudinal (lengthwise) direction of the separation film while the unit cells are disposed such that the electrode taps of the unit cells are inserted into the corresponding openings.

The electrode assembly according to the present invention is constructed in a structure in which the upper ends of the electrodes are wrapped by the continuous separation film. Consequently, even when the electrode assembly is moved in the inner space of a battery case due to the falling of the electrode assembly, it is possible to prevent the occurrence of an internal short circuit due to contact between the electrodes and electrode leads. Also, the opposite sides of the electrode assembly, which are relatively long, are exposed. As a result, it is easy to impregnate an electrolyte into the electrodes, and therefore, the time necessary to wet the electrodes is considerably reduced.

Typically, the unit cells according to the present invention may be bicells or full cells.

The construction of the bicells and the full cells and a method of constructing an electrode assembly using the bicells and the full cells are fully disclosed in Korean Unexamined Patent Publication No. 2001-82058, No. 2001-82059, and No. 2001-82060, which have been filed in the name of the applicant of the present patent application. The disclosures of the above-mentioned patent publications are hereby incorporated by reference as if fully set forth herein.

The full cell, which is used as the unit cell, is a cell constructed in a cathode/separator/anode unit structure. Specifically, the full cell is a cell having a cathode and an anode positioned at the opposite sides thereof. The basic structure of the full cell may be either a cathode/separator/anode structure or a cathode/separator/anode/separator/cathode/separator/anode structure. In order to construct an electrochemical cell including secondary batteries using the full cells, it is necessary to stack a plurality of full cells one on another, such that the cathodes and the anodes face each other, while a separation film is disposed between the full cells.

On the other hand, the bicell, which is used as the unit cell, is a cell constructed in either a cathode/separator/anode/separator/cathode unit structure or an anode/separator/cathode/separator/anode unit structure. Specifically, the bicell is a cell having identical electrodes positioned at the opposite sides thereof. Representative examples of the bicell are illustrated in FIGS. 3 and 4. Hereinafter, a cell having the cathode/separator/anode/separator/cathode structure will be referred to as a "C-type bicell," and a cell having the anode/separator/cathode/separator/anode structure will be referred to as an "A-type bicell." In other words, the cell having the cathodes positioned at the opposite sides thereof is the C-type cell, whereas the cell having the anodes positioned at the opposite sides thereof is the A-type cell.

The number of the cathodes, the anodes, and the separators constituting the bicells is not particularly restricted so long as the electrodes at the opposite sides of the bicells have the same structure. In order to construct an electrochemical cell including secondary batteries using the bicells, it is necessary to stack a plurality of bicells one on another, such that the C-type bicells and the A-type bicells face each other, while a separation film is disposed between the bicells.

The full cells and the bicells are manufactured by coupling the cathodes and the anodes with each other while the separation film is disposed between the cathodes and the anodes. A preferable example of the coupling method is thermal welding.

In the full cells and the bicells, the cathodes are manufactured by applying a mixture of a cathode active material, a conducting agent, and a binder onto a cathode current collector, and drying and pressing the cathode current collector. According to circumstances, a filler may be added to the mixture.

Generally, the cathode current collector has a thickness of 3 to 500 µm. The cathode current collector is not particularly restricted so long as the cathode current collector has high conductivity while the cathode current collector does not induce any chemical change in the battery. For example, the cathode current collector may be made of stainless steel, aluminum, nickel, titanium, or plastic carbon. Alternatively, the cathode current collector may be made of aluminum or stainless steel the surface of which is treated with carbon, nickel, titanium, or silver. The cathode current collector may have micro concavo-convex parts formed at the surface thereof so as to increase the attaching force of the cathode active material. The cathode current collector may be constructed in various forms, such as a film, a sheet, a foil, a net, a porous body, a foam body, and a non-woven fabric body.

The cathode active material may be, but is not limited to, a layered compound, such as lithium cobalt oxide ($LiCoO_2$) or lithium nickel oxide ($LiNiO_2$) or a compound replaced by one or more transition metals; lithium manganese oxide represented by a chemical formula $Li_{1+x}Mn_{2-x}O_4$ (where, x=0 to 0.33) or lithium manganese oxide, such as $LiMnO_3$, $LiMn_2O_3$, or $LiMnO_2$; lithium copper oxide ($Li_2CuO_2$); vanadium oxide, such as $LiV_3O_8$, $LiFe_3O_4$, $V_2O_5$, or $Cu_2V_2O_7$; Ni-sited lithium nickel oxide represented by a chemical formula $LiNi_{1-x}M_xO_2$ (where, M=Co, Mn, Al, Cu, Fe, Mg, B, or Ga, and x=0.01 to 0.3); lithium manganese composite oxide represented by a chemical formula $LiMn_{2-x}M_xO_2$ (where, M=Co, Ni, Fe, Cr, Zn, or Ta, and x=0.01 to 0.1) or a chemical formula $Li_2Mn_3MO_8$ (where, M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conducting agent is generally added such that the conducting agent has 1 to 50 weight percent based on the total weight of the compound including the cathode active material. The conducting agent is not particularly restricted so long as the conducting agent has high conductivity while the conducting agent does not induce any chemical change in the battery. For example, graphite, such as natural graphite or artificial graphite; carbon blacks, such as carbon black, acetylene black, Ketjen black, channel black, furnace black, lamp black and thermal black; conductive fibers, such as carbon fibers and metallic fibers; metallic powders, such as carbon fluoride powder, aluminum powder and nickel powder; conductive whiskers, such as zinc oxide and potassium titanate; conductive metal oxides, such as titanium oxide; and polyphenylene derivatives may be used as the conducting agent.

The binder for the cathode active material is a component assisting in binding between the active material and conductive agent, and in binding with the current collector. The binder according to the present invention is typically added in an amount of 1 to 50% by weight based on the total weight of the compound including the cathode active material. As examples of the binder, there may be used polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional component used to inhibit expansion of the cathode. There is no particular limit to the filler, so long as it does not cause chemical changes in the battery and is a fibrous material. As examples of the filler, there may be used olefin polymers, such as polyethylene and polypropylene; and fibrous materials, such as glass fiber and carbon fiber.

On the other hand, the anodes are manufactured by applying an anode active material onto an anode current collector, and drying and pressing the cathode current collector. According to circumstances, a conducting agent, a binder, and a filler may be added to the anode active material.

Generally, the anode current collector has a thickness of 3 to 500 µm. The anode current collector is not particularly restricted so long as the anode current collector has high conductivity while the anode current collector does not induce any chemical change in the battery. For example, the cathode current collector may be made of copper, stainless steel, aluminum, nickel, titanium, or plastic carbon. Alternatively, the cathode current collector may be made of copper or stainless steel the surface of which is treated with carbon, nickel, titanium, or silver, or an aluminum-cadmium alloy. Like the cathode current collector, the anode current collector may have micro concavo-convex parts formed at the surface thereof so as to increase the attaching force of the anode active material. The anode current collector may be constructed in various forms, such as a film, a sheet, a foil, a net, a porous body, a foam body, and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 5 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; conductive polymer, such as polyacetylene; or a Li—Co—Ni based material.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer, such as polypropylene, or glass fibers or polyethylene, which has chemical resistance and hydrophobicity, are used. When a solid electrolyte, such as a polymer, is employed as the electrolyte, the solid electrolyte may also serve as both the separator and electrolyte. The separation film used in the present invention may be made of the same material as the separator or may be made of a material different from the that of the separator.

The lithium salt-containing, non-aqueous electrolyte is composed of a non-aqueous electrolyte and lithium. As the non-aqueous electrolyte, a non-aqueous electrolytic solution, solid electrolyte or inorganic solid electrolyte may be used.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. According to circumstances, in order to impart incombustibility, the non-aqueous electrolyte may further include halogen-containing solvents such as carbon tetrachloride and ethylene trifluoride. Furthermore, in order to improve high-temperature storage characteristics, the non-aqueous electrolyte may additionally include carbon dioxide gas.

When an electrode assembly according to the present invention is constructed using the above-described full cells or bicells as the unit cells, a plurality of unit cells are first arranged on a continuous separation film formed in the shape of a long sheet such that electrodes of the respective unit cells, i.e., electrode taps, face each other. The separation film has openings into which the electrode taps of the unit cells are inserted. The size of the openings is a size sufficient for the electrode taps or a pair of electrode taps facing each other to be inserted into the openings and protrude through the openings. If possible, it is preferable that the width of the openings is small sufficient to cover the majority of the upper ends of the electrodes or the majority of the upper ends of a pair of the electrodes facing each other. Consequently, when the unit cells are sequentially folded in the longitudinal direction of the separation film such that the unit cells are stacked one on another, the electrode assembly is manufactured in a structure in which the electrode taps of the respective unit cells protrude through the separation film while the electrical insulation between the unit cells is accomplished by the separation film.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
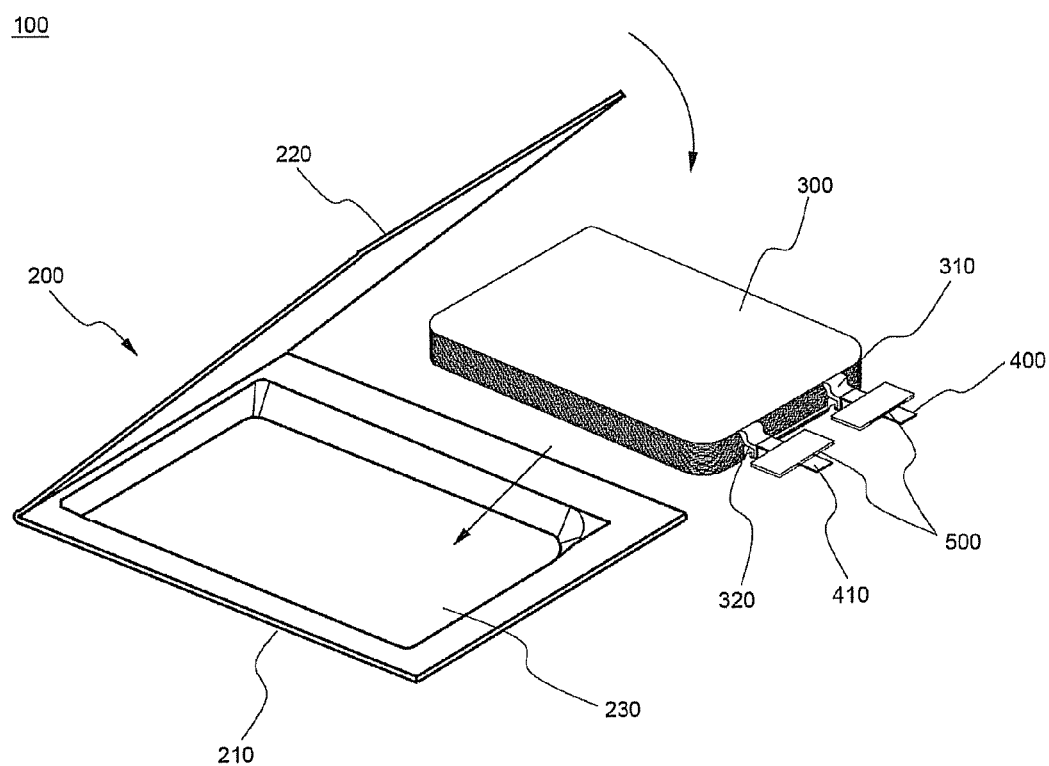
FIG. 1 is a perspective view illustrating a process for assembling a conventional pouch-shaped battery.
Figure 2:
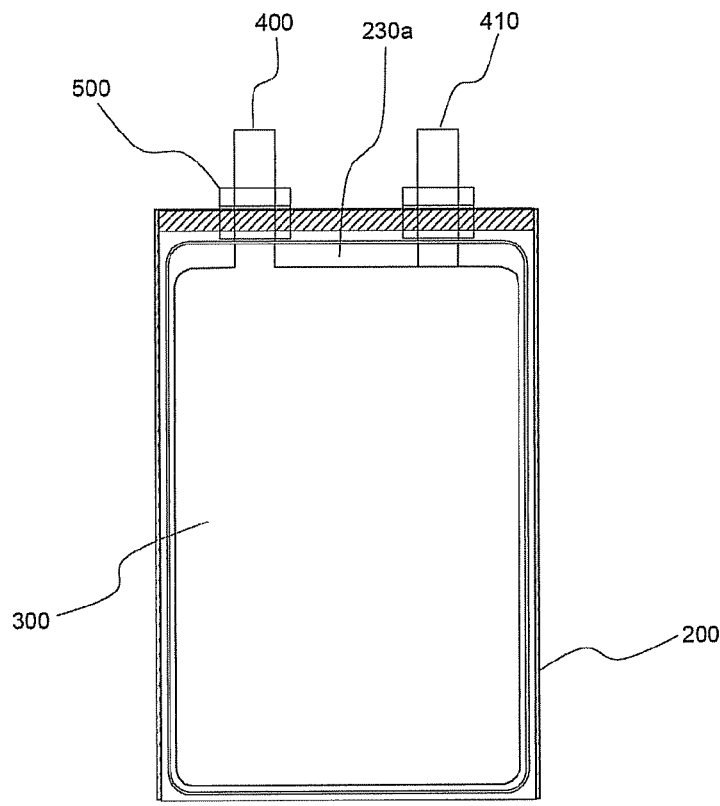
FIG. 2 is a see-through view illustrating the conventional pouch-shaped battery after the assembly process is completed.
Figure 3:
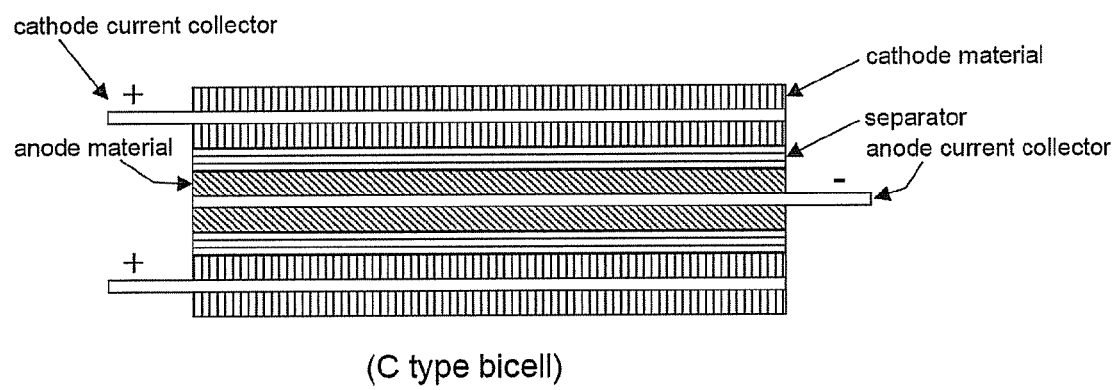
FIGS. 3 and 4 are typical views respectively illustrating an exemplary C-type bicell and an exemplary A-type bicell that can be used as a unit cell of an electrode assembly according to the present invention.
Figure 4:
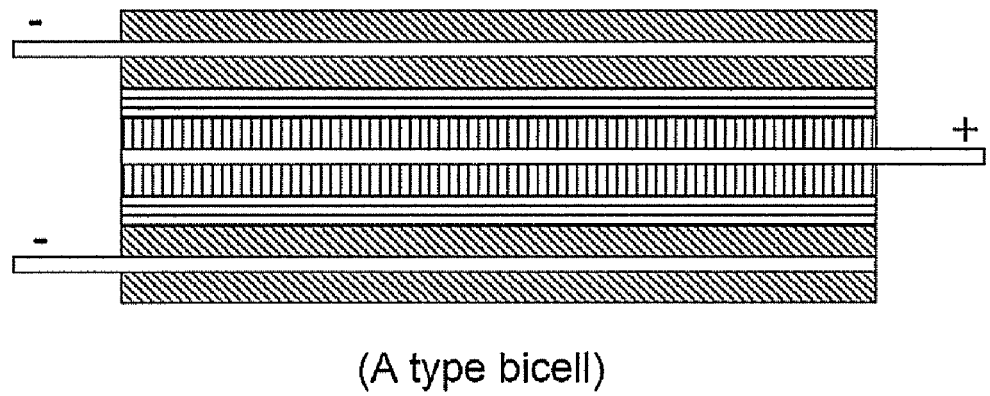
Figure 5:
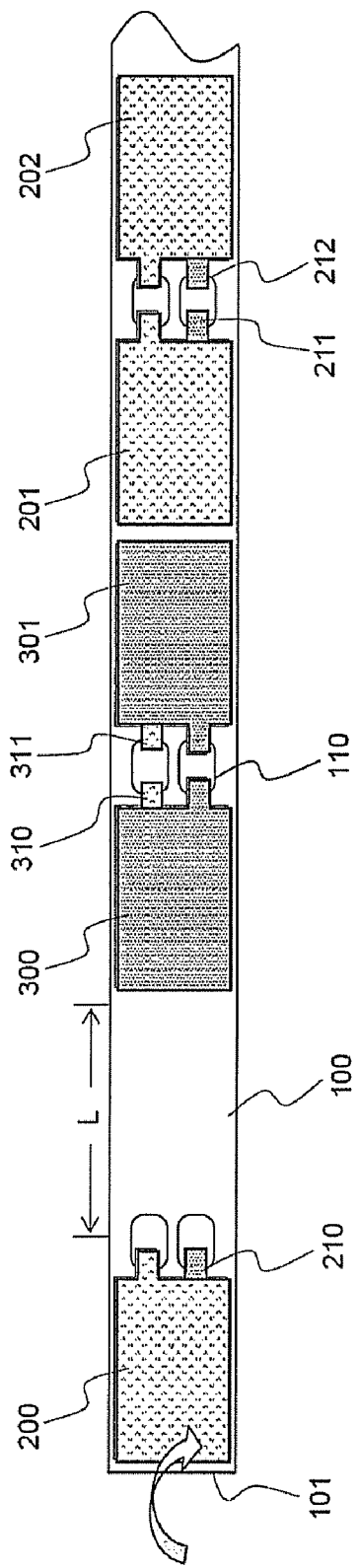
FIGS. 5 and 6 are typical views respectively illustrating a process for manufacturing an electrode assembly using the bicells shown in FIGS. 5 and 6 according to a preferred embodiment of the present invention.
Figure 6:
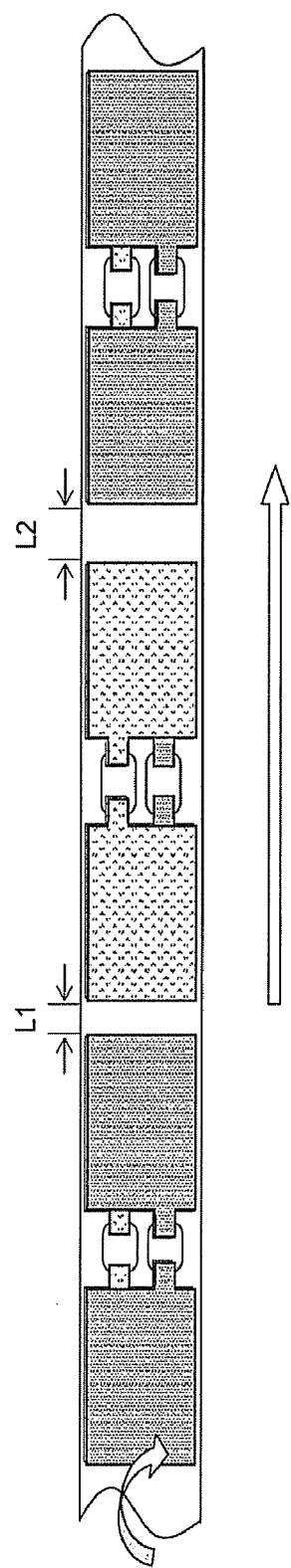

FIGS. 5 and 6 are typical views respectively illustrating a process for manufacturing an electrode assembly using the bicells according to a preferred embodiment of the present invention.

Referring to these drawings, a separation film 100 is a film formed in the shape of a long sheet. The separation film 100 is constructed in the same porous structure as the separators of the unit cells. The separation film 100 has a width slightly greater than that of the unit cells.

C-type bicells 201 and 202 and A-type bicells 300 and 301 are arranged in the longitudinal direction of the separation film 100 such that electrode taps 211 and 212 of the C-type bicells 201 and 202 face each other and electrode taps 310 and 311 of the A-type bicells 300 and 301 face each other. The separation film 100 has openings 110, into which the electrode taps 211 and 212; 310 and 311 are inserted.

The arrangement of the bicells will be described. First, the first C-type bicell 200 is arranged at one end 101 of the separation film 100, from which the folding operation is initiated, such that the lower end of the first C-type bicell 200 is located at the end 101 of the separation film 100. Next, the first A-type bicell 300 is arranged at a position spaced by a distance L corresponding to the length of one bicell from the first C-type bicell 200 such that the first A-type bicell 300 has the same orientation as the first C-type bicell 200. The spaced region between the first C-type bicell 200 and the first A-type bicell 300 is a region where the first C-type bicell 200 contacts the first A-type bicell 300 while the separation film 100 fully surrounds the first C-type bicell 200. After the first C-type bicell 200 is folded once, the first C-type bicell 200 is brought into contact with the first A-type bicell 300 while the electrode taps 210 of the first C-type bicell 200 are adjacent to the electrode taps 310 of the first A-type bicell 300.

The second A-type bicell 301 is arranged such that the electrode taps 311 of the second A-type bicell 301 face the electrode taps 310 of the first A-type bicell 300. The second A-type bicell 301 contacts the first C-type bicell 200 while the separation film 100 is disposed between the second A-type bicell 301 and the first C-type bicell 200. At the lower end of the second A-type bicell 301, the second C-type bicell 201 and the third C-type bicell 202 are arranged such that the electrode taps 211 of the second C-type bicell 201 and the electrode taps 212 of the third C-type bicell 202 face each other. The second C-type bicell 201 contacts the first C-type bicell 200 while the separation film 100 is disposed between the second C-type bicell 201 and the first C-type bicell 200.

When the electrode assembly is manufactured using the bicells as described above, bicells of the same type are arranged such that the electrode taps of the bicells face each other, and bicells of a type different from the bicells of the same type are arranged at the lower end of the bicells of the same type such that the bicells of the different type are adjacent to each other. As a result, the electrode assembly is manufactured in a cathode/anode/cathode/anode structure. At this time, no bicell is arranged at the region adjacent to the first bicell, and therefore, the spaced region corresponding to the size of the bicell is provided. This spaced region surrounds the front surface of the first bicell during the folding of the bicells, whereby the electrical isolation between the bicells is maintained. In the specification, when the unit cells are positioned on the separation film prior to the folding of the bicells, one surface of each bicell with which the separation film is brought into contact is defined as a rear surface, and the opposite surface of the each bicell is defined as a front surface.

As the bicells are sequentially folded, the thickness of the folded bicells is increased. For this reason, the distance between the lower ends of the adjacent bicells is gradually increased as shown in FIG. 6 (L1<L2).

Figure 7:
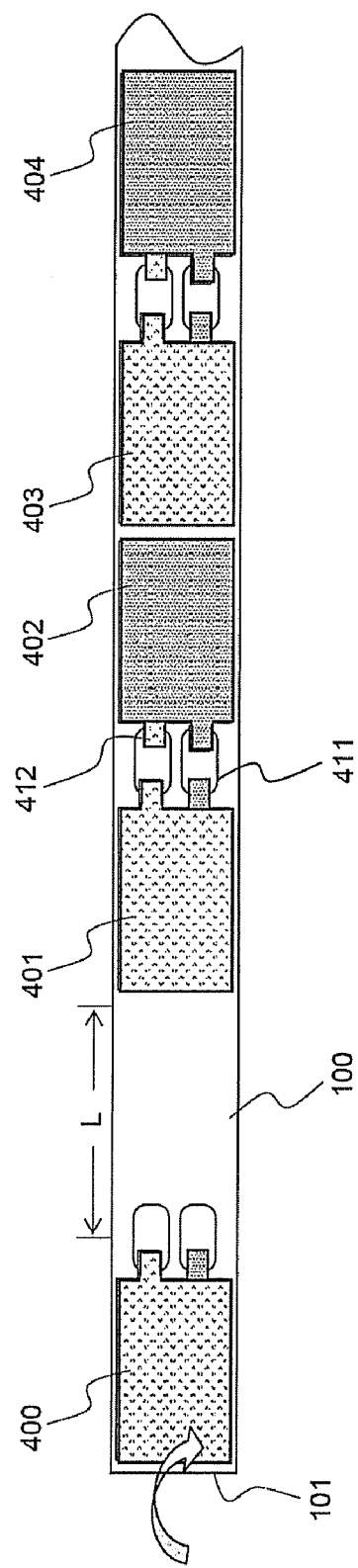
FIG. 7 is a typical view illustrating a process for manufacturing an electrode assembly using full cells according to another preferred embodiment of the present invention.

FIG. 7 is a typical view illustrating a process for manufacturing an electrode assembly using full cells according to another preferred embodiment of the present invention.

Referring to FIG. 7, a first full cell 400 is arranged at one end 101 of a separation film 100, from which the folding operation is initiated, such that the lower end of the first full cell 400 is located at the end 101 of the separation film 100, and a cathode surface of the first full cell 400 is directed to the front surface of the first full cell 400.

Next, in the same manner as in FIG. 5, a second full cell 401 is arranged at a position spaced by a distance corresponding to the length of one full cell from the first full cell 400 such that the second full cell 401 has the same orientation as the first full cell 400, i.e., a cathode surface of the second full cell 401 is directed to the front surface of the second full cell 401. When the first full cell 400 is folded, a rear surface (an anode surface) of the first full cell 400 is brought into contact with the front surface (the cathode surface) of the second full cell 401 while the both surfaces of the first full cell 400 are covered by the separation film 100.

A third full cell 402 is arranged adjacent to the second full cell 401 such that electrode taps 412 of the third full cell 402 face electrode taps 411 of the second full cell 401. A front surface (an anode surface) of the third full cell 402 is brought into contact with the front surface (the cathode surface) of the first full cell 400 while the separation film 100 is disposed between the third full cell 402 and the first full cell 400. The arrangement of a fourth full cell 403 and a fifth full cell 404 is identical to that of the second full cell 401 and the third full cell 402.

When the electrode assembly is manufactured using the full cells as described above, the full cells are arranged such that the electrode taps of the full cells face each other while different electrode surfaces of the full cells are directed to the same surface (the front surface), and the full cells are arranged at the lower ends of the respective full cells such that different electrode surfaces of the full cells are directed to the same surface (the front surface) while the full cells are adjacent to each other. As a result, the electrode assembly is manufactured in a cathode/anode/cathode/anode structure. At this time, no full cell is arranged at the region adjacent to the first full cell, and therefore, the spaced region corresponding to the size of the full cell is provided. This spaced region surrounds the front surface of the first full cell during the folding of the full cells, whereby the electrical isolation between the full cells is maintained.

In the same manner as the bicells of FIG. 6, the distance between the lower ends of the adjacent full cells is gradually increased in the folding direction.

In a preferred embodiment, when unit cells constructed in the form of the full cells or the bicells are positioned on the separation film, the unit cells may be attached to the separation film in order to easily perform the folding operation. This attachment may be accomplished by thermal welding.

The present invention also provides an electrochemical cell including the electrode assembly with the above-stated construction.

A representative example of the electrochemical cell may be a secondary battery. Especially, a lithium secondary battery using lithium ions as a medium is preferably used.

Based on the shape of an electrode assembly and the structure and shape of a battery case, the lithium secondary battery may be classified as a cylindrical battery, a prismatic battery, or a pouch-shaped battery. Among them, the pouch-shaped battery, which has a safety-related problem when external impacts are applied to the battery, for example, the battery falls, is preferably applied to the present invention.

As previously described, the pouch-shaped battery is a battery having an electrode assembly mounted in a pouch-shaped case made of a laminate sheet including a metal layer and a resin layer. Generally, a case made of an aluminum laminate sheet is widely used for the pouch-shaped battery.

A method of manufacturing the electrochemical cell, including the secondary batteries, using the electrode assembly is well known, and therefore, a detailed description thereof will not be given.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrode assembly is a hybrid type electrode assembly solving the problems of the jelly-roll type electrode assembly and the stacking type electrode assembly. Consequently, when external impacts are applied to the electrode assembly, for example, the electrode assembly falls, it is possible to minimize the occurrence of internal short circuits and thus to improve the safety of the electrode assembly. Furthermore, it is possible to perform the process for impregnating (wetting) the electrolyte into the electrodes in a short time during the assembly of the electrochemical cell.

What is claimed is:

1. An electrode assembly, comprising
a separation film including openings formed therethrough; and
a plurality of unit cells folded with the separation film, each unit cell including electrode taps disposed at an upper end thereof,
wherein the plurality of unit cells are folded with the separation film by disposing the each unit cell on the separation film such that electrode taps of a unit cell face electrode taps of another unit cell disposed adjacent to the unit cell and by folding the unit cells with the separation film in the longitudinal direction of the separation film while the unit cells are disposed on the separation film such that the electrode taps of each unit cell are inserted into corresponding openings of the openings,
wherein the separation film covers at least a portion of upper and lower ends of the each unit cell,
wherein the plurality of unit cells includes bicells of two types or full cells,
wherein, when the bicells of two types are used as the plurality of unit cells, the plurality of unit cells are folded by disposing the bicells of two types such that electrode taps of bicells of a same type face each other and lower ends of bicells of different types face each other, and by disposing a first bicell at an end portion of the separation film a part from a bicell disposed next to the first bicell such that a portion of the separation film between the first bicell and the bicell next to the first bicell covers a surface of the first bicell during the folding, and
wherein when the full cells are used as the plurality of unit cells, the plurality of unit cells are folded by disposing the full cells such that a polarity of a surface in contact with the separation film of a full cell is different from a polarity of a surface in contact with the separation film of a next full cell disposed next to the full cell, and by disposing a first full cell disposed at an end of the separation film apart from a full cell disposed next to the first bicell such that a portion of the separation film between the first full cell and the full cell next to the first full cell covers a surface of the first full cell during the folding.

2. The electrode assembly according to claim 1, wherein the separation film is made of the same material as separators constituting the unit cells or different porous film.

3. The electrode assembly according to claim 1, wherein the plurality of unit cells are attached to the separation film by thermal welding.

4. The electrode assembly according to claim 1, wherein the plurality of unit cells are arranged such that the distance between lower ends of the plurality of unit cells is gradually increased in a direction of the folding.

5. An electrochemical cell including an electrode assembly according to claim 1.

6. The electrochemical cell according to claim 5, wherein the electrochemical cell is a secondary battery.

7. The electrochemical cell according to claim 6, wherein the secondary battery is a lithium secondary battery using lithium ions as a medium.

8. The electrochemical cell according to claim 7, wherein the secondary battery is constructed in a structure in which an electrode assembly is mounted in a pouch-shaped case made of a laminate sheet including a metal layer and a resin layer.

* * * * *